United States Patent [19]

Meyer

[11] 4,114,594

[45] Sep. 19, 1978

[54] DEVICE FOR SYNCHRONOUSLY ROTATING SOLAR COLLECTORS

[76] Inventor: Warren A. Meyer, 612 Comanche St., NE., Albuquerque, N. Mex. 87107

[21] Appl. No.: 735,067

[22] Filed: Oct. 22, 1976

[51] Int. Cl.² .......................... F24J 3/02; F16H 27/02
[52] U.S. Cl. .................................. 126/270; 126/271; 350/288; 350/294; 74/89.22
[58] Field of Search ............... 126/270, 271; 237/1 A; 60/641; 350/293, 294, 299, 24, 83, 304; 74/89.22

[56] References Cited

U.S. PATENT DOCUMENTS

| | | | |
|---|---|---|---|
| 1,111,239 | 9/1914 | Smelser | 126/270 |
| 1,162,505 | 11/1915 | Nichols | 126/271 |
| 1,345,758 | 7/1920 | Folsom | 126/271 |
| 3,603,664 | 9/1971 | James | 350/83 |
| 3,847,136 | 11/1974 | Salvail | 126/271 |

*Primary Examiner*—Kenneth W. Sprague
*Assistant Examiner*—James C. Yeung
*Attorney, Agent, or Firm*—Clarence O'Brien; Harvey B. Jacobson

[57] ABSTRACT

A device for rotating solar collectors has a pulley assembly connected to an individual solar collector of a bank of such collectors for rotating the collector in synchronization with the sun. Connected to the pulley assembly by a flexible member is a drive arrangement including a rigid drive rod mounted for reciprocating movement perpendicular to the extent of a shaft on which the collector is journaled. The flexible member is disposed about a non-circular track provided on the pulley assembly and secured to the drive rod for rotating the pulley as a function of movement of the drive rod.

10 Claims, 6 Drawing Figures

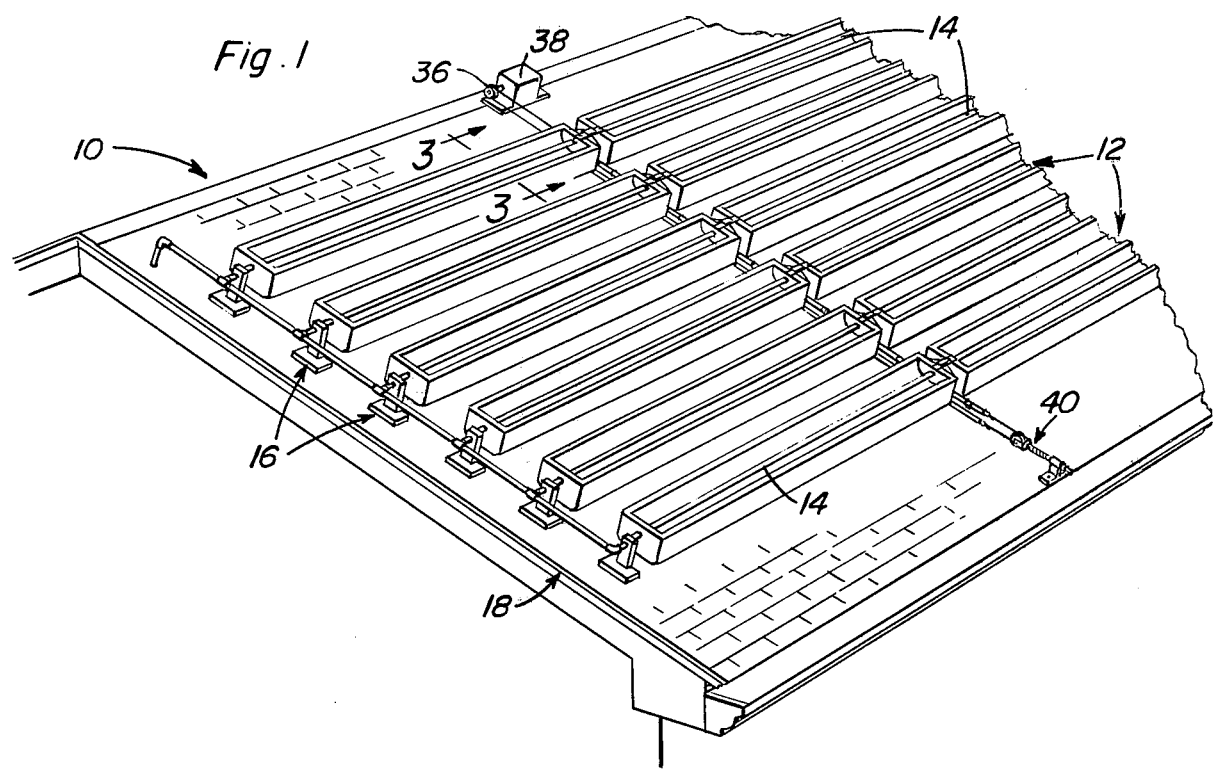
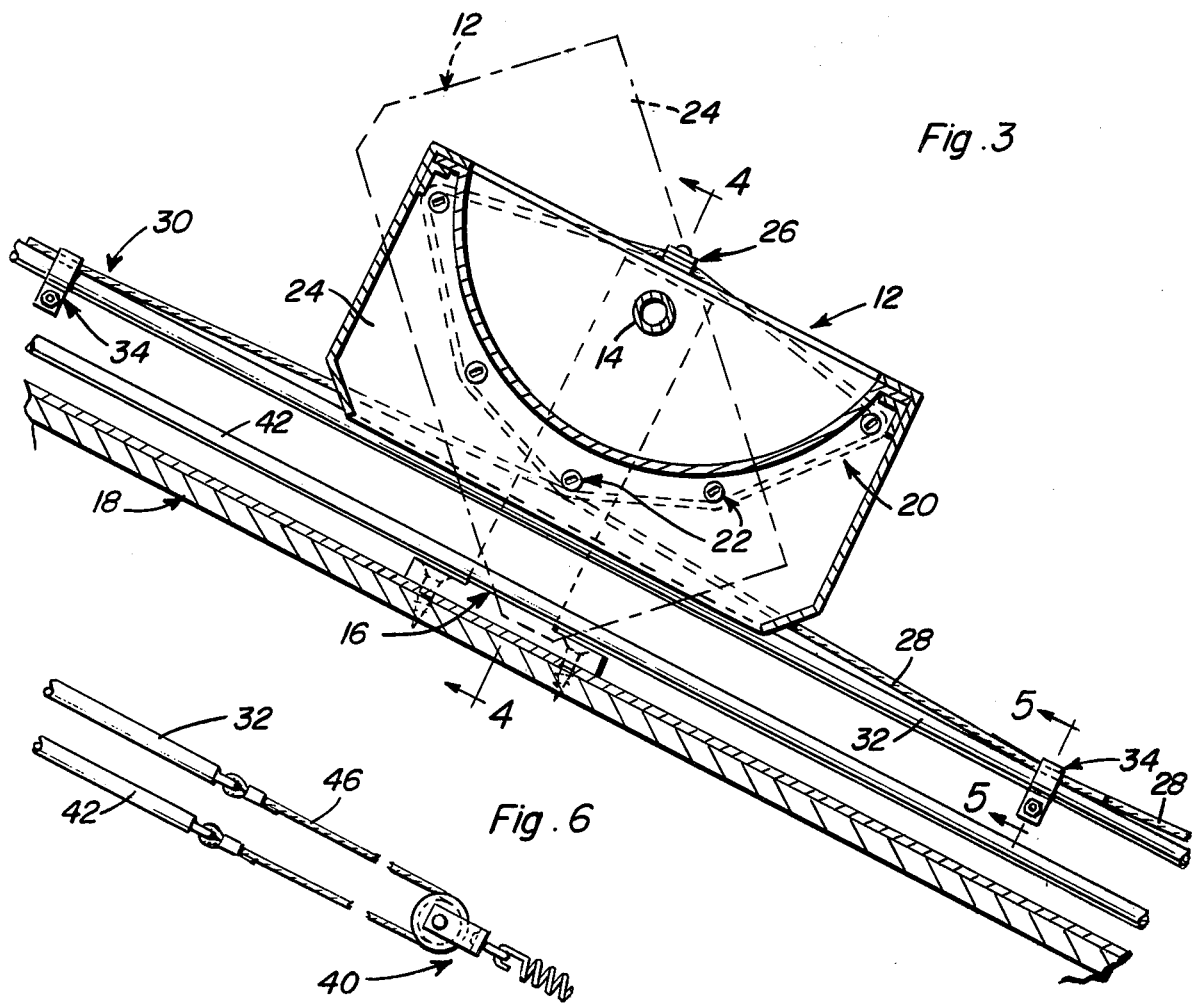

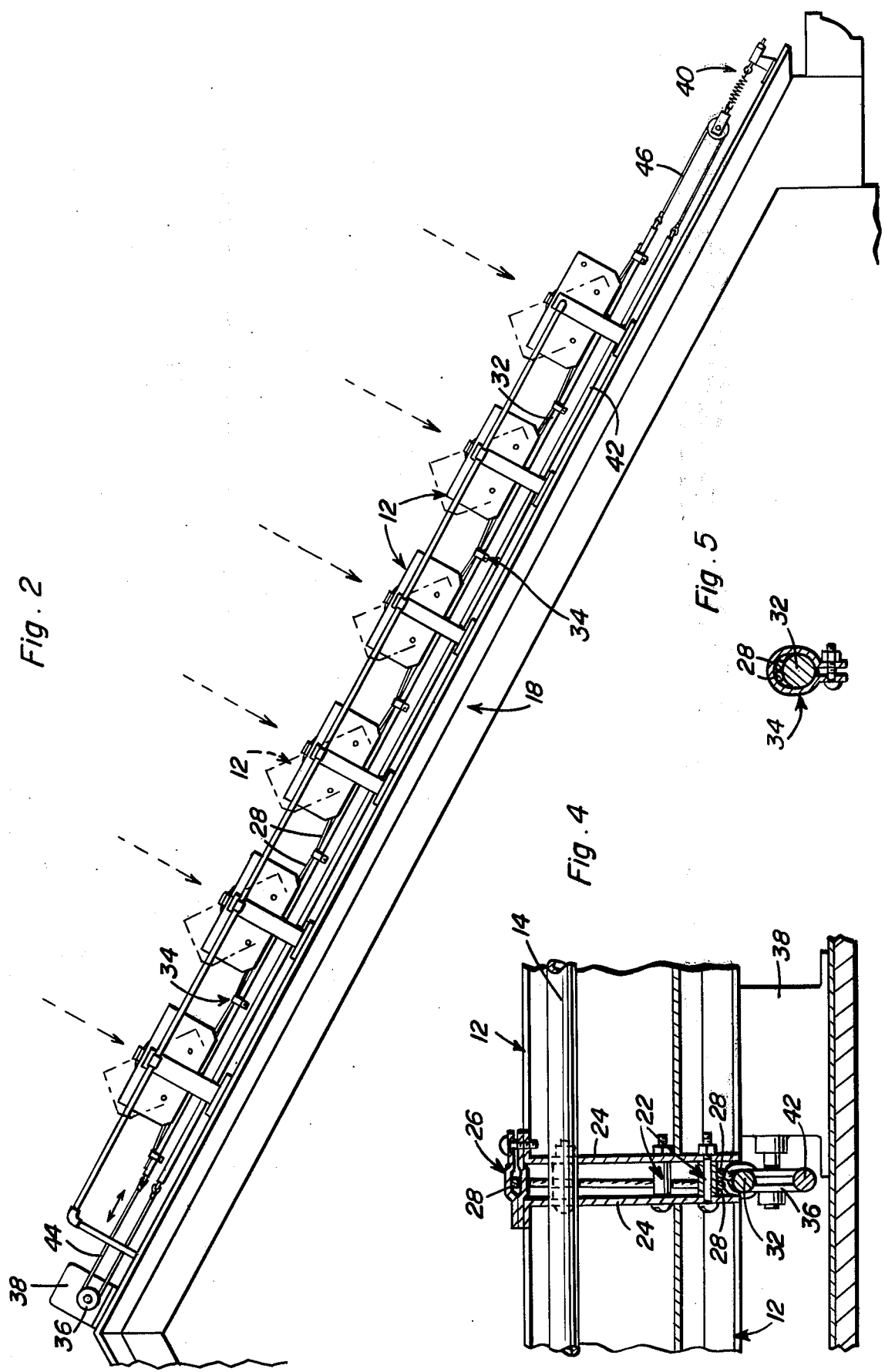

DEVICE FOR SYNCHRONOUSLY ROTATING SOLAR COLLECTORS

BACKGROUND OF THE INVENTION

1. Field of the Invention

This invention relates generally to solar collector systems, and particularly to a device for synchronously rotating solar collectors of such a system.

2. Description of the Prior Art

It is known to mount a plurality of solar collectors in parallel rows with one or more collectors to a row. For concentrating collectors which focus the rays of the sun upon a small heat collecting surface, it is necessary to rotate the collectors in synchronization with the sun in order to cause the rays of the sun to intersect the heat collecting surface for the duration of the collecting period. For large rotation angles, such as plus or minus 90° to plus or minus 180°, pulleys connected together by a continuous cable are generally used on each collector. The cable is looped around each pulley and fastened to the pulley at a single point. As the cable is pulled from one end to the other, the series of parallel collectors ccan be caused to turn in unison.

This scheme is satisfactory as long as the number of collectors to be turned is small and the torque required to turn the collectors is also small. If the required torque and/or the number of collectors is large, it becomes increasingly difficult to select a cable which is flexible enough to go around the pulleys and at the same time is large enough in cross section to prevent measurable elongation of the cable. As a consequence, it is difficult to keep all of the collectors turning in synchronization. That is, the collector at the end of the cable where the force is applied to the cable turns as the cable is pulled; however, the collector at the opposite end of the cable either does not turn immediately or does not turn as much as the first collector due to cable stretch.

A solution to this problem would be to use large diameter cable and large diameter pulleys. The large pulleys are necessary to reduce the force on the cable for a given required turning torque of the collectors and also to accommodate the thick cable. As a consequence, the expense of the arrangement increases rapidly as cable diameter and pulley diameter are increased.

U.S. Pat. No. 1,162,505, issued Nov. 30, 1915 to T. F. Nichols, discloses a solar boiler wherein a plurality of reflectors are simultaneously pivoted or rotated about associated conduits by means of a cable and pulley arrangement. Further, devices for collecting solar energy in which the collectors follow the sun and are driven by a motor and drive connection can be found in U.S. Pat. Nos. 509,393, issued Nov. 28, 1893; 820,127, issued May 8, 1906; 2,141,330, issued Dec. 27, 1938; 2,156,352, issued May 2, 1939; and 3,872,854, issued Mar. 25, 1975.

SUMMARY OF THE INVENTION

It is an object of the present invention to provide a device for synchronously rotating solar collectors without the use of overly large pulleys and cables.

It is another object of the present invention to provide a solar collector rotating device which is adaptable for use with existing solar collector systems.

It is a still further object of the present invention to provide a solar collector rotating device which can be integrated into the solar collectors themselves.

These and other objects are achieved according to the present invention by providing a device having: a pulley assembly connected to a solar collector for rotating the collector; a reciprocating arrangement movably mounted for rotating the pulley assembly; and a flexible member connected to the pulley assembly and to the reciprocating arrangement for rotating the pulley assembly in response to movement of the reciprocating arrangement. The pulley assembly includes a track disposed eccentrically with respect to a shaft on which the associated solar collector is journaled, with the pulley assembly being provided with a clamp securing the flexible member to the pulley assembly at a point on the track closest to the shaft. The pulley assembly, and therefore the solar collector connected to the pulley assembly, is rotated by reciprocation of a longitudinally extending, rigid drive rod partially forming the reciprocating arrangement and disposed extending perpendicularly to the longitudinal extent of the shaft of the associated collector. A suitable drive unit is connected to the drive rod for reciprocating the drive rod parallel to the longitudinal extent of the drive rod.

According to a preferred embodiment of the invention, the reciprocating arrangement is additionally formed by a rotatably mounted drive pulley connected to a suitable drive unit, a spring-loaded pulley, a longitudinally extending, rigid return rod, and a pair of flexible elements. Each of the latter are connected to the drive rod and return rod, and are arranged over a respective one of the drive pulley and spring-loaded pulley. In this manner, the drive rod, return rod, and pair of flexible elements form an endless member mounted on the drive pulley and spring-loaded pulley.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, schematic, perspective view showing a solar collector system provided with a synchronization device according to the invention mounted on the roof of a residence or similar structure.

FIG. 2 is an enlarged, fragmentary, schematic, side elevational view of the arrangement shown in FIG. 1.

FIG. 3 is an enlarged, fragmentary, sectional view taken generally along the line 3—3 of FIG. 1.

FIG. 4 is a fragmentary, sectional view taken generally along the line 4—4 of FIG. 3.

FIG. 5 is a sectional view taken generally along the line 5—5 of FIG. 3, but with some parts removed.

FIG. 6 is an enlarged, fragmentary, side elevational view showing a detail of the lower right-hand portion of FIG. 2.

DESCRIPTION OF THE PREFERRED EMBODIMENTS

Referring now more particularly to FIG. 1 of the drawings, a solar collector system 10 is illustrated as including a plurality of solar collectors 12 each mounted for rotation about an associated one of a plurality of substantially parallel shafts 14. The shafts 14, which are in actuality conduits through which a heat transfer medium flows, are supported at each end thereof by suitable stands 16 anchored to a roof 18, and the like. The details of construction of collectors 12 is more specifically set forth in my co-pending application Ser. No. 688,830, filed May 21, 1976 and entitled "Solar Collector."

As is shown in FIGS. 2 through 6 of the drawings, a device according to the invention for synchronously rotating collectors 12 includes a pulley assembly 20 connected to a pair of adjacent collectors 12 and being preferably formed by the illustrated plurality of spacers 22 connected to opposed end walls 24 of an associated pair of collectors 12. A clamp 26 disposed extending between the end walls 24 partially forms the pulley assembly 20 and functions to secure through pulley assembly 20 a flexible member 28 disposed extending about spacers 22, which cooperate with clamp 26 to form a track arranged eccentrically with respect to shaft 14.

A reciprocating arrangement 30 is movably mounted on roof 18 for rotating pulley assembly 20 by means of the flexible member 28. More specifically, the flexible member 28, which may be continuous or in lengths, as illustrated, long enough to loop a pulley assembly 20 and be clamped to reciprocating arrangement 30, will cooperate with the non-circular track of pulley assembly 20 to cause the collector 12 to rotate about the associated conduit or shaft 14. While five spacers 22 have been shown in the drawings, it is to be understood that the number of spacers employed, as well as the configuration of the track, can vary, with as few as three spacers 22 being sufficient to define the track. Although the track is illustrated as being generally in the form of a semi-circle, it is to be understood that the track can be more nearly rectangular.

The eccentric disposition of the track of pulley assembly 20 with respect to an associated shaft 14 cooperates with the non-circular configuration of the track in order to cause the reciprocating movements of the secured portions, or ends, of a flexible member 28 associated with a particular pulley assembly 20 to cause the collectors 12 connected to the pulley assembly 20 to be rotated about their associated shafts 14.

The reciprocating arrangement 30 includes a longitudinally extending, rigid drive rod 32 arranged extending perpendicularly to the shafts 14 and having connected thereto the flexible member or members 28 as by suitable clamps 34.

The reciprocating arrangement 30 further includes a rotatably mounted drive pulley 36 connected to a conventional drive unit 38. A spring-loaded pulley 40 is anchored to roof 18 to cooperate with the drive pulley 36, while a return rod 42 and a pair of flexible elements 44 and 46 are connected to one another and to the drive rod 32 to form an endless member disposed over the pulleys 36 and 40. More specifically, the drive rod 32 and return rod 42 are disposed as the longitudinal runs of the endless member, while the flexible elements 44 and 46 are connected between corresponding ends of the rods 32 and 42 and are disposed over an associated one of the pulleys 36 and 40. By this arrangement, intermittent drive of drive pulley 36 by drive unit 38 will cause drive rod 32 and return rod 42 to reciprocate between the pulleys 36 and 40, and by means of the endless member or members 28 being secured to drive rod 32 will cause a synchronized rotation of the collectors 12.

As can be appreciated from the above description and from the drawings, the present invention provides a simple, reliable, and compact device for efficiently synchronizing rotation of a bank of solar collectors. The cable used to form the flexible member or members 28 can be relatively small in cross section since the load on any one cable is that necessary for only the one associated pulley and not for all of the pulleys. Because of the low cost of a given pulley, the pulley can be made quite large, thus reducing the required tension in the drive rod. The spacers forming the pulley track need not be located at equal radial distances from the axis of rotation, although they could be if desired. The radial distance of the spacers can be varied to give any desired drive rod tension versus pulley angle relationship required.

The track could also be formed by pulleys of conventional construction instead of the sheet metal end walls 24 and spacer 22 construction as described above.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A device for synchronously rotating solar collectors, comprising, in combination:
    (a) pulley means connected to a rectangular collector for rotating same;
    (b) reciprocating means movably mounted for rotating the pulley means; and
    (c) flexible means connected to the pulley means and reciprocating means for rotating the pulley means in response to movement of the reciprocating means, the pulley means including a track disposed eccentrically with respect to an axis about which the associated solar collector rotates, and the pulley means being provided with clamp means mounted on the pulley means at a point on the track closest to the axis of rotation for securing the flexible means to the pulley means.

2. A device as defined in claim 1, wherein the reciprocating means includes a longitudinally extending, rigid drive rod arranged extending perpendicularly to the shaft of the collector, and drive means connected to the drive rod for reciprocating the drive rod parallel to the longitudinal extent of the drive rod.

3. A device as defined in claim 1, wherein the flexible means includes a flexible member secured to the pulley means, and the reciprocating means includes clamp means for securing the flexible member to the reciprocating means.

4. A device for synchronously rotating solar collectors, each having an axis of rotation comprising, in combination:
    (a) pulley means connected to a rectangular collector for rotating same;
    (b) reciprocating means movably mounted for rotating the pulley means; and
    (c) flexible means connected to the pulley means and reciprocating means for rotating the pulley means in response to movement of the reciprocating means, the reciprocating means including a longitudinally extending, rigid drive rod arranged extending perpendicularly to the axis of rotation of the collector, and drive means connected to the drive rod for reciprocating the drive rod parallel to the longitudinal extent of the drive rod, the reciprocating means further including a rotatably mounted drive pulley and a spring-loaded pulley, a longitudinally extending, rigid return rod, and a pair of flexible elements, each of the latter being connected to the drive rod and return rod and arranged over a respective one of the drive pulley and the spring-loaded pulley, the drive rod, return rod, and pair of flexible elements forming an endless member mounted on the drive pulley and spring-loaded pulley, the drive pulley being connected to a drive unit for rotation thereby.

5. A device as defined in claim 1, wherein the pulley means includes a track disposed eccentrically with respect to a shaft on which the associated solar collector is journaled, and the pulley means being provided with clamp means mounted on the pulley means at a point on the track closest to the shaft for securing the flexible means to the pulley means.

6. A solar collector system, comprising, in combination:
   (a) a plurality of solar collectors each mounted for rotation about an axis parallel to axes of other of the solar collectors;
   (b) pulley means connected to the solar collectors for rotating same;
   (c) reciprocating means movably mounted for rotating the pulley means; and
   (d) flexible means connected to the pulley means and reciprocating means for rotating the pulley means in response to movement of the reciprocating means, the flexible means being connected to the reciprocating means between each of the pulley means, the pulley means including a plurality of pulley assemblies, one pulley assembly for a pair of coaxially disposed ones of the solar collectors, with each of the pulley assemblies including a track disposed eccentrically with respect to the axis of rotation of the pair of solar collectors, with the pulley assembly being provided with clamp means mounted on the pulley assembly at a point on the track closest to the axis of rotation of the pair of solar collectors for securing the flexible means to the pulley assembly.

7. A structure as defined in claim 6, wherein the reciprocating means includes a longitudinally extending, rigid drive rod arranged extending perpendicularly to the axis of rotation of the solar collectors, and drive means connected to the drive rod for reciprocating the drive rod parallel to the longitudinal extent of the drive rod.

8. A solar collector system, comprising, in combination:
   (a) a plurality of solar collectors each mounted for rotation about an axis parallel to axes of other of the solar collectors;
   (b) pulley means connected to the solar collectors for rotating same;
   (c) reciprocating means movably mounted for rotating the pulley means; and
   (d) flexible means connected to the pulley means and reciprocating means for rotating the pulley means in response to movement of the reciprocating means, the flexible means being connected to the reciprocating means between each of the pulley means, the reciprocating means including a longitudinally extending, rigid drive rod arranged extending perpendicularly to the axis of rotation of the solar collectors, and drive means connected to the drive rod for reciprocating the drive rod parallel to the longitudinal extent of the drive rod, the reciprocating means further including a rotatably mounted drive pulley and a spring-loaded pulley, a longitudinally extending, rigid return rod, and a pair of flexible elements, each of the latter being connected to the drive rod and return rod and arranged over a respective one of the drive pulley and spring-loaded pulley, the drive rod, return rod, and pair of flexible elements forming an endless member mounted on the drive pulley and spring-loaded pulley, the drive pulley being connected to a drive unit for rotation thereby.

9. A structure as defined in claim 6, wherein the pulley means includes a plurality of pulley assemblies, one pulley assembly for a pair of coaxially disposed ones of the solar collectors, with each of the pulley assemblies including a track disposed eccentrically with respect to the axis of rotation of the pair of solar collectors, with the pulley assembly being provided with clamp means mounted on the pulley assembly at a point on the track closest to the axis of rotation for securing the flexible means to the pulley assembly.

10. A structure as defined in claim 6, wherein the pulley means includes a plurality of pulley assemblies, and the flexible means includes a flexible member secured to one of the pulley assemblies, with the reciprocating means including clamp means for securing the flexible member to the reciprocating means at points between the pulley assemblies adjacent to the one of the pulley assemblies.

* * * * *